(12) United States Patent
Carlson et al.

(10) Patent No.: US 8,588,864 B1
(45) Date of Patent: Nov. 19, 2013

(54) ELECTRONIC DEVICE WITH AN IMPROVED ACOUSTIC MESH SYSTEM

(75) Inventors: Christopher P. Carlson, Libertyville, IL (US); Jason E. Jordan, Palatine, IL (US); Vivek M. Patel, Elk Grove Village, IL (US)

(73) Assignee: Motorola Mobility LLC, Libertyville, IL (US)

( * ) Notice: Subject to any disclaimer, the term of this patent is extended or adjusted under 35 U.S.C. 154(b) by 9 days.

(21) Appl. No.: 13/459,470

(22) Filed: Apr. 30, 2012

(51) Int. Cl.
*H04M 1/00* (2006.01)

(52) U.S. Cl.
USPC ... 455/569.1; 455/90.1; 455/90.3; 455/575.8; 381/386; 381/353

(58) Field of Classification Search
USPC .......... 455/569.1, 90.1, 90.3, 575.8; 381/386, 381/353
See application file for complete search history.

(56) References Cited

U.S. PATENT DOCUMENTS

| | | | |
|---|---|---|---|
| 8,320,599 B2 * | 11/2012 | Lorenz | 381/353 |
| 2005/0265574 A1 * | 12/2005 | Holmes et al. | 381/388 |
| 2009/0245565 A1 | 10/2009 | Mittleman et al. | |
| 2009/0274336 A1 * | 11/2009 | Infanti | 381/386 |
| 2010/0080400 A1 * | 4/2010 | Sibbald et al. | 381/71.6 |

* cited by examiner

*Primary Examiner* — Sanh Phu

(57) ABSTRACT

An electronic device as provided here includes a primary housing, an acoustic transducer, a lower layer of acoustic mesh material, and an upper layer of acoustic mesh material. An interior volume is defined within the primary housing. The primary housing includes an interior mounting surface, an exterior mounting surface, and an acoustic port. The transducer is located within the interior volume, and the lower layer of mesh material is coupled between the interior mounting surface and the transducer to cover a lower opening of the acoustic port. The upper layer of mesh material covers an upper opening of the acoustic port. Each layer of mesh material provides an amount of acoustic transparency and an amount of visual obscurity such that the transducer is effectively hidden from view without adversely impacting the audio performance characteristics of the transducer.

20 Claims, 5 Drawing Sheets

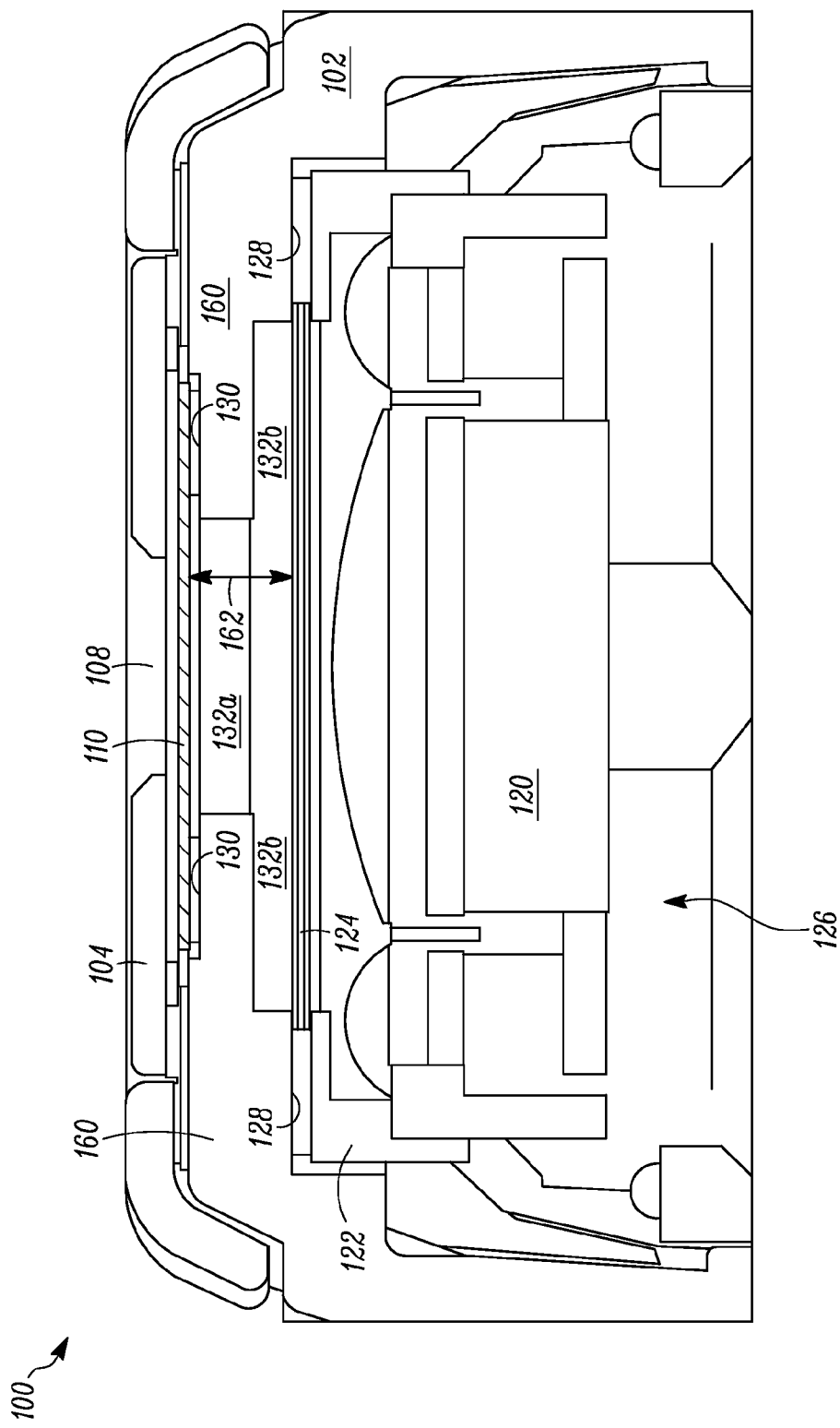

ELECTRONIC DEVICE WITH AN IMPROVED ACOUSTIC MESH SYSTEM

TECHNICAL FIELD

Embodiments of the subject matter described herein relate generally to electronic devices, such as mobile electronic devices. More particularly, embodiments of the subject matter relate to an acoustic mesh system for an acoustic transducer of a mobile electronic device.

BACKGROUND

Mobile electronic devices are very well known, and such devices have become increasingly popular. Indeed, mobile electronic devices such as cellular telephones, handheld video game devices, and digital media players have now become virtually ubiquitous in many societies. Many electronic devices utilize acoustic transducers (e.g., loudspeakers, microphones, or piezoelectronic elements) to generate and/or receive sound. For example, most cellular telephone devices include at least one loudspeaker to accommodate speakerphone functions, audio playback functions, ring tone functions, and the like. The volume, fidelity, and other performance characteristics of the loudspeaker (e.g., "how good is the speakerphone feature?") in a mobile electronic device can play an important role in the decision to purchase one device over another.

A loudspeaker in a mobile electronic device may be associated with an external audio port opening that accommodates the sound emitted by the loudspeaker. Unfortunately, unprotected and uncovered external ports in an electronic device can allow contaminants such as water, dirt, and dust to enter the interior of the device housing. Moreover, unprotected and uncovered external ports may provide a clear line of sight into the interior space of the device. For example, it may be possible for a person to see some or all of the underlying acoustic transducer and/or other components of the electronic device through an acoustic port opening. Although such visibility may not adversely impact the performance of the device, it can be cosmetically unappealing. Accordingly, acoustically "transparent" material (such as an acoustic mesh or screen) can be used to cover the loudspeaker and, thus, obscure its visibility. In certain applications, however, a layer of acoustic mesh material may not provide sufficient cosmetic masking of the underlying device components. Moreover, some acoustic mesh materials may degrade the audio performance of the loudspeaker.

Accordingly, there is a need for an electronic device with an improved acoustic mesh system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 9 is a cross-sectional view of a portion of the mobile electronic device, as viewed from line 9-9 in FIG. 2.

Figure 2:
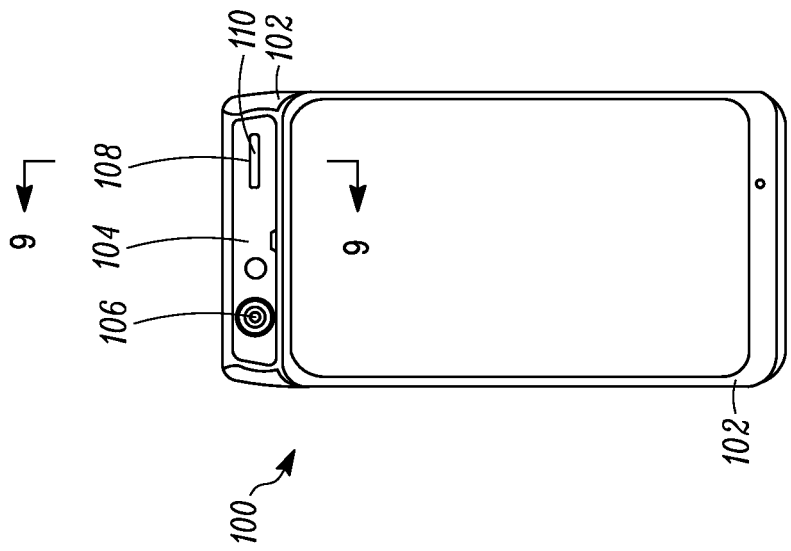
FIG. 2 is a rear view of the mobile electronic device shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An exemplary embodiment of an electronic device is presented here. The electronic device includes a primary housing that defines at least a portion of an interior volume for the electronic device. The primary housing has an interior mounting surface, an exterior mounting surface, and an acoustic port formed therein. An acoustic transducer is located within the interior volume, and a lower layer of acoustic mesh material is coupled between the interior mounting surface and the acoustic transducer. The lower layer of acoustic mesh material covers a lower opening of the acoustic port, and the lower layer of acoustic mesh material has a bottom surface facing the acoustic transducer and a top surface facing the acoustic port. The electronic device also includes an upper layer of acoustic mesh material coupled to the exterior mounting surface and covering an upper opening of the acoustic port. The upper layer of acoustic mesh material has a bottom surface facing the acoustic port. The lower layer of acoustic mesh material and the upper layer of acoustic mesh material provide an amount of acoustic transparency and an amount of visual obscurity. As a result, the underlying components of the electronic device are hidden from view in a manner that does not adversely affect the audio quality, fidelity, or emitted volume of sound generated by the acoustic transducer.

Figure 1:
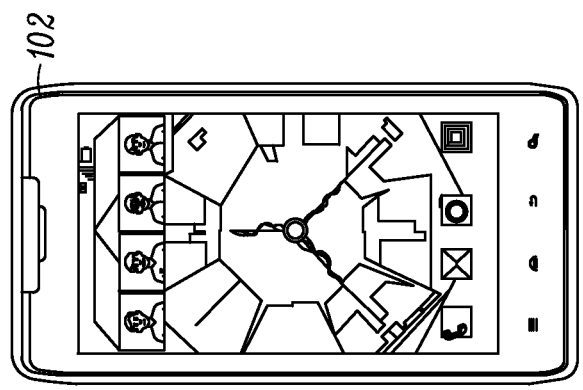
FIG. 1 is a front face view of an exemplary embodiment of a mobile electronic device.

Turning now to the drawings, FIG. 1 is a front face view of an exemplary embodiment of a mobile electronic device 100, and FIG. 2 is a rear view of the mobile electronic device 100. It should be appreciated that the mobile electronic device 100 shown in the figures is merely one of many different possible platforms, implementations, and realizations, and that the illustrated embodiment of the mobile electronic device 100 is not intended to limit or restrict the scope of the subject matter described herein. This particular embodiment of the mobile electronic device 100 represents a modern Internet-enabled cellular telephone having enhanced functionality such as email, digital media player, camera, and video game features.

The illustrated embodiment of the mobile electronic device 100 includes a primary housing 102 that represents the external body or "shell" of the device 100. In practice, the primary housing 102 may be fabricated from a plurality of individual parts that are coupled together, or it may be fabricated as a one-piece unitary component. Although not always required, the device 100 also includes a decorative cover 104 coupled to a portion of the primary housing 102. For this embodiment, the decorative cover 104 is located on the back side of the device 100 (see FIG. 2). The decorative cover 104 may include one or more openings formed therein to accommodate certain features or elements of the device 100. For this example, the decorative cover 104 includes a camera opening 106 to accommodate a camera lens, and a port opening 108 formed therein to accommodate an acoustic port (which is described in more detail below). The port opening 108 accommodates sound emitted from an underlying acoustic transducer. At least one layer of acoustic mesh material 110 hides the transducer from a view external to the device 100, such as a view from the perspective of FIG. 2.

Figure 3:
FIG. 3 is a schematic diagram that illustrates a conventional single-layer acoustic mesh approach for an acoustic transducer of an electronic device.
Figure 4:
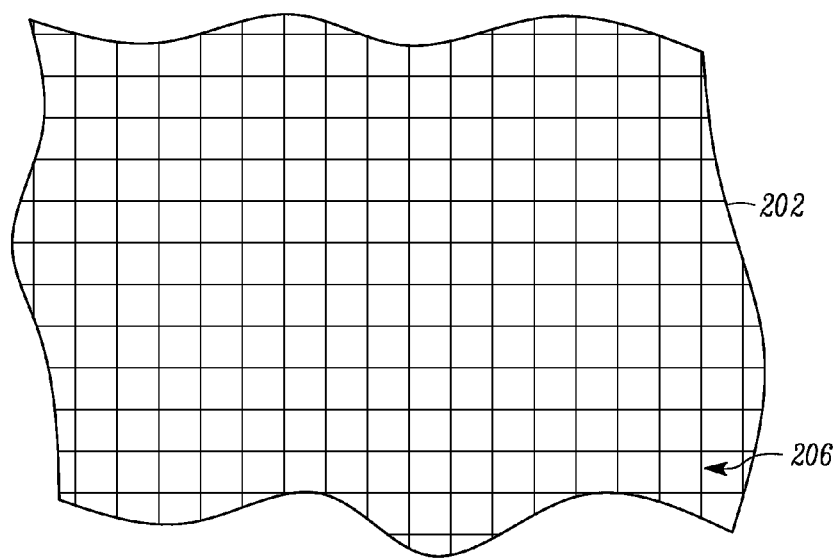
FIG. 4 is a schematic diagram that illustrates a mesh or pore size of the acoustic mesh depicted in FIG. 3.

FIG. 3 is a schematic diagram that illustrates a conventional single-layer acoustic mesh approach for an acoustic transducer of an electronic device. FIG. 3 represents a cross-sectional side view of an acoustic transducer 200, a layer of low density acoustic mesh material 202, and related mounting structure 204. It should be appreciated that FIG. 3 schematically depicts the acoustic mesh material 202 as a row of dots to illustrate its low density characteristics. FIG. 4 is a schematic diagram that illustrates a mesh or pore size of the low density acoustic mesh material 202. The mesh or pore size may be defined as the width or height dimension of each space 206 in the acoustic mesh material 202, as the volume of each space 206 in the acoustic mesh material 202, or the like. For this particular example, the acoustic mesh material 202 is considered to be "low density" in that the mesh or pore size is large relative to a "high density" acoustic mesh material. Accordingly, a "low density" acoustic mesh material will generally exhibit more open space, less visual obscurity, and more acoustic transparency than a "high density" acoustic mesh material having the same composition. Therefore, although the arrangement depicted in FIG. 3 has good acoustic performance characteristics (e.g., high acoustic transparency, little to no volume attenuation, little to no audio distortion or coloring), the low density acoustic mesh material 202 is somewhat visually transparent, which makes the underlying acoustic transducer 200 visible through the acoustic mesh material 202. As mentioned above, the overall cosmetic appeal of the electronic device may be compromised if the acoustic transducer 200 is easy to see through its associated acoustic port.

Figure 5:
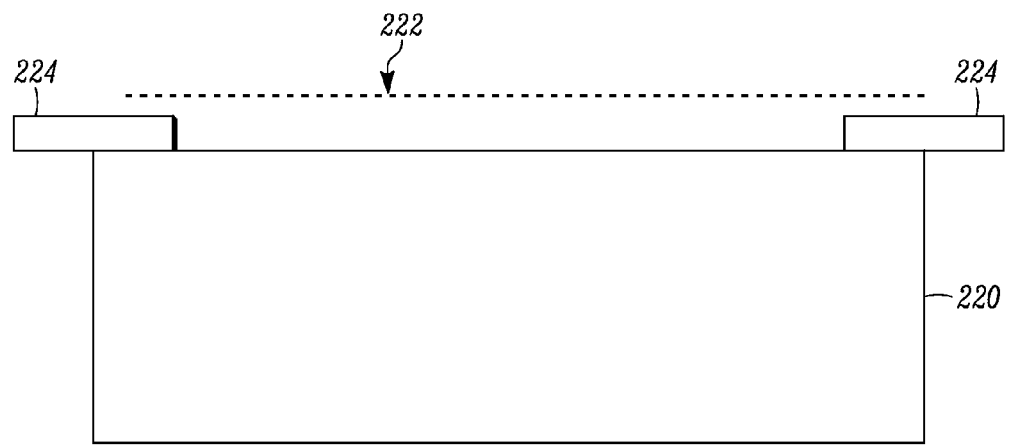
FIG. 5 is a schematic diagram that illustrates another single-layer acoustic mesh approach for an acoustic transducer of an electronic device.
Figure 6:
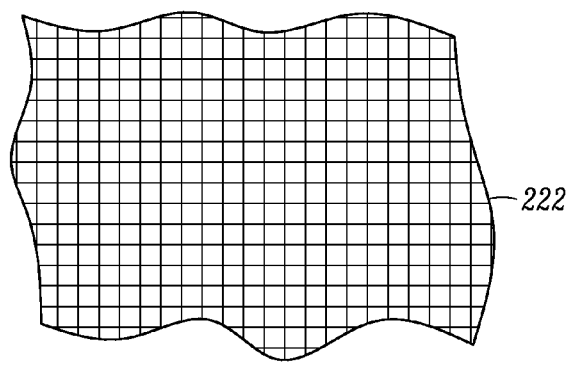
FIG. 6 is a schematic diagram that illustrates a mesh or pore size of the acoustic mesh depicted in FIG. 5.

FIG. 5 is a schematic diagram that illustrates another single-layer acoustic mesh approach for an acoustic transducer of an electronic device. FIG. 5 represents a cross-sectional side view of an acoustic transducer 220, a layer of high density acoustic mesh material 222, and related mounting structure 224. FIG. 6 is a schematic diagram that illustrates the mesh or pore size of the high density acoustic mesh material 222. In contrast to the relatively large mesh/pore size used for the low density acoustic mesh material 202, the high density acoustic mesh material 222 exhibits a relatively small mesh/pore size, as depicted in FIG. 6. Consequently, the high density acoustic mesh material 222 can visibly obscure the underlying acoustic transducer 220. Unfortunately, this optical quality of the high density acoustic mesh material 222 comes at the expense of audio fidelity and acoustic performance. In this regard, the high density acoustic mesh material 222 has lower acoustic transparency (relative to the low density acoustic mesh material 202), which can result in volume attenuation, frequency response coloring, etc.

Figure 7:
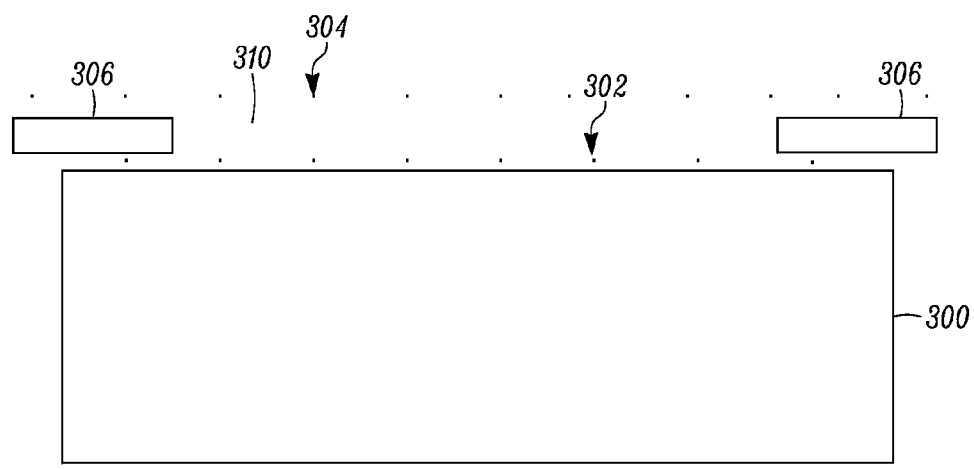
FIG. 7 is a schematic diagram that illustrates an exemplary embodiment of a multi-layer acoustic mesh approach for an acoustic transducer of an electronic device.

FIG. 7 is a schematic diagram that illustrates an exemplary embodiment of a multi-layer acoustic mesh approach for an acoustic transducer of an electronic device. This simplified rendition of the embodiment depicts a cross-sectional side view of an acoustic transducer 300, a first (lower) layer of low density acoustic mesh material 302, a second (upper) layer of low density acoustic mesh material 304, and related mounting structure 306. For this particular embodiment, the material used for the first and second layers of low density acoustic mesh material 302, 304 is identical, and both layers of the material exhibit the same mesh or pore size. In preferred embodiments, the first layer of low density acoustic mesh material 302 is offset from, misaligned with, and/or staggered relative to the second layer of low density acoustic mesh material 304. Such offsetting makes it more difficult to see the underlying acoustic transducer 300 from points external to the electronic device.

Notably, the first and second layers of acoustic mesh material 302, 304 are spaced apart from one another by the mounting structure 306, resulting in an acoustic air gap 310 defined between the two layers. The acoustic air gap 310 can be shaped and sized for acoustic transparency such that the sound emitted from the acoustic transducer 300 is not attenuated or colored by any noticeable amount. Moreover, the use of low density acoustic mesh material (rather than a high density or a medium density material) allows sound waves to pass through both layers in an acoustically transparent manner. Therefore, the arrangement depicted in FIG. 7 has: (1) good acoustic performance characteristics (e.g., high acoustic transparency, little to no volume attenuation); and (2) high visual opaqueness, which makes the underlying acoustic transducer 300 difficult if not impossible to see through the two layers of low density acoustic mesh material. Accordingly, the overall cosmetic appearance of the electronic device is improved without degrading the sonic performance of the acoustic loudspeaker 300.

Figure 8:
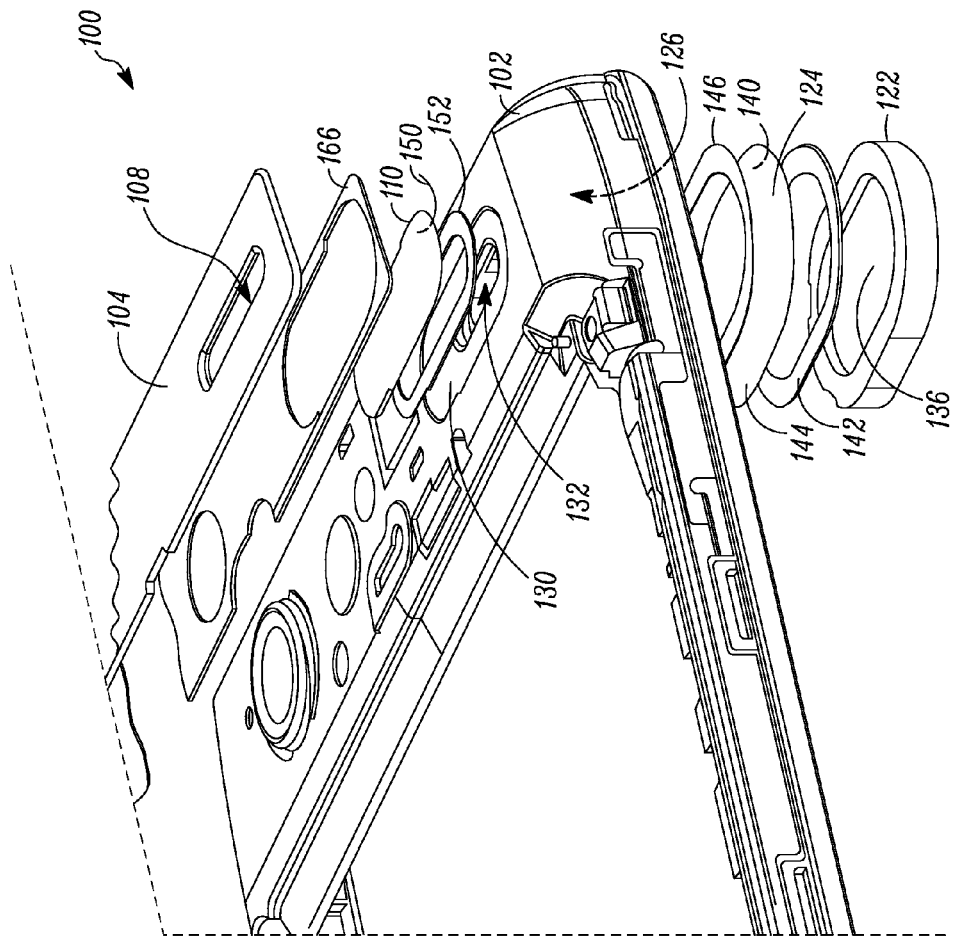
FIG. 8 is an exploded perspective view of a portion of the mobile electronic device shown in FIG. 1.

Referring again to FIG. 1 and FIG. 2, the mobile electronic device 100 is suitably configured to implement an acoustic system of the type schematically depicted in FIG. 7, namely, an acoustic system having at least two layers of low density acoustic mesh material associated with the port opening 108. FIG. 8 is an exploded perspective view of a portion of the mobile electronic device 100, and FIG. 9 is a cross-sectional view of a portion of the mobile electronic device 100, as viewed from line 9-9 in FIG. 2.

As explained above with reference to FIG. 1 and FIG. 2, the device 100 includes a primary housing 102, a decorative cover 104 with a port opening 108 formed therein, and an upper layer of acoustic mesh material 110. These elements are also shown in FIG. 8 and FIG. 9. Moreover, the device 100 may also include, without limitation: an acoustic transducer 120; a transducer frame 122; and a lower layer of acoustic mesh material 124.

The primary housing 102 may serve as the main structural component or shell of the electronic device 100. In practice, the primary housing 102 may be fabricated as a one-piece component, e.g., a molded plastic component. For this particular embodiment, the primary housing 102 defines at least a portion of an interior volume 126 for the electronic device 100. For the illustrated embodiment, the primary housing 102 includes or defines an interior mounting surface 128 (or any comparable mounting element or feature), an exterior mounting surface 130 (or any comparable mounting element or feature), and an acoustic port 132 formed therein.

Although not always required, the acoustic port 132 has an oblong or oval perimeter (see FIG. 2) and a stepped cross-sectional profile (see FIG. 9). As depicted in FIG. 9, the acoustic port 132 includes an upper acoustic port 132a that communicates with a lower acoustic port 132b. The upper acoustic port 132a defines the upper opening and upper end of the acoustic port 132, which terminates at the exterior mounting surface 130 of the primary housing 102. The lower acoustic port 132b defines the lower opening and lower end of the acoustic port 132, which terminates at the interior mounting surface 128 of the primary housing 102. As shown in FIG. 9, the upper acoustic port 132a and the lower acoustic port 132b are continuous with one another, such that the acoustic port 132 extends between the interior mounting surface 128 and the exterior mounting surface 130. It should be appreciated that the specific shape, size, stepped profile, and configuration of the acoustic port 132 need not be as depicted in the figures, and that an embodiment of the acoustic port 132 could be acoustically tuned to obtain the desired acoustic performance characteristics.

The acoustic port 132 could be considered to be a part of the interior volume 126 of the primary housing 102. The interior volume 126 is suitably shaped, sized, and configured to accommodate various internal components of the mobile electronic device 100, including, without limitation, the acoustic transducer 120, the transducer frame 122, and the lower layer of acoustic mesh material 124. In this regard, the acoustic transducer, the transducer frame 122, and the lower layer of acoustic mesh material 124 are all located and maintained within the interior volume 126, as shown in FIG. 9.

The transducer frame 122 is used to physically couple the acoustic transducer 120 to the primary housing 102. As shown in FIG. 8, the transducer frame 122 includes an opening 136 that accommodates the propagation of sound waves emitted from the acoustic transducer 120. In certain embodiments, the acoustic transducer 120 is realized as a loudspeaker for use with a speakerphone function of the electronic device 100. The acoustic transducer 120 could also be used to support ring tone, audio/video playback, alarm, and other functions that require the generation of sound. It should be appreciated that the techniques and approaches described here could also be utilized for an embodiment where the acoustic transducer 120 is realized as a microphone.

With continued reference to FIG. 8 and FIG. 9, the lower layer of acoustic mesh material 124 is coupled between the interior mounting surface 128 and the acoustic transducer 120. More specifically, the lower layer of acoustic mesh material 124 is coupled between the interior mounting surface 128 and the transducer frame 122. As a result, the lower layer of acoustic mesh material 124 is positioned between the acoustic transducer 120 and the lower end of the acoustic port 132 (see FIG. 9). In certain embodiments, the lower layer of acoustic mesh material 124 is affixed or adhered to the transducer frame 122 and to the interior mounting surface 128 using a suitable adhesive material, layer, or composition. Referring to FIG. 8, the bottom surface 140 of the lower layer of acoustic mesh material 124 (i.e., the surface facing the acoustic transducer 120) may be affixed to the transducer frame 122 and/or to the acoustic transducer 120 using a first adhesive layer 142. Similarly, the top surface 144 of the lower layer of acoustic mesh material 124 (i.e., the surface facing the acoustic port 132) may be affixed to the interior mounting surface 128 using a second adhesive layer 146. In particular, the top surface 144 of the lower layer of acoustic mesh material 124 is coupled to an area of the interior mounting surface 128 that surrounds the lower opening of the acoustic port 132. Thus, the lower layer of acoustic mesh material 124 overlies the acoustic transducer 120, and extends over and covers the lower opening and lower end of the acoustic port 132.

The upper layer of acoustic mesh material 110 is coupled to at least the exterior mounting surface 130. For this particular embodiment, the upper layer of acoustic mesh material 110 is coupled between the exterior mounting surface 130 and the decorative cover 104. As a result, the upper layer of acoustic mesh material 110 is located between the decorative cover 104 and the upper end of the acoustic port 132. In certain embodiments, the upper layer of acoustic mesh material 110 is affixed or adhered to the exterior mounting surface 130 using a suitable adhesive material, layer, or composition. Referring to FIG. 8, the bottom surface 150 of the upper layer of acoustic mesh material 110 (i.e., the surface facing the acoustic port 132) may be affixed to the exterior mounting surface 130 using a third adhesive layer 152. In particular, the bottom surface 150 of the upper layer of acoustic mesh material 110 is coupled to an area of the exterior mounting surface 130 that surrounds the upper opening of the acoustic port 132. Thus, the upper layer of acoustic mesh material 110 overlies the lower layer of acoustic mesh material 124, and extends over and covers the upper opening and upper end of the acoustic port 132.

As mentioned previously, the lower layer of acoustic mesh material 124 and the upper layer of acoustic mesh material 110 are configured to provide an amount of acoustic transparency (to propagate sound waves in an efficient manner) and to provide an amount of visual obscurity (to hide the underlying acoustic transducer 120 and other components). Thus, the lower layer of acoustic mesh material 124 cooperates with the upper layer of acoustic mesh material 110 to hide the acoustic transducer 120 from a view external to the electronic device 100. In other words, a person looking through the port opening 108 of the decorative cover 104 will see the upper layer of acoustic mesh material 110, but will have little to no visibility of anything located below the lower layer of acoustic mesh material 124 (see FIG. 2).

In certain implementations, the lower layer of acoustic mesh material 124 and the upper layer of acoustic mesh material 110 have the same, consistent pore/mesh size. In exemplary embodiments, the lower layer of acoustic mesh material 124 and the upper layer of acoustic mesh material 110 have the same defined acoustic transmission properties and characteristics, e.g., the same defined acoustic resistance. For example, the lower layer of acoustic mesh material 124 and the upper layer of acoustic mesh material 110 are preferably fabricated from an identical mesh material. Depending upon the particular implementation, the mesh material used for the electronic device 100 could be a pliable fabric material, a screen material, a molded or machined component, or the like. As one non-limiting example, the SAATIFIL ACOUSTEX 032 type of fabric (available from SaatiTech) could be used to manufacture the upper and lower layers of acoustic mesh material 110, 124. The published specification for this material indicates that the pore size is 38 micrometers. It should be appreciated that alternative materials could be used for the upper layer of acoustic mesh material 110 and/or for the lower layer of acoustic mesh material 124 if so desired. The SAATIFIL ACOUSTEX 032 fabric is merely one suitable material that is readily available; another suitable material is SEFAR ACOUSTIC HF fabric.

As best shown in FIG. 9, a portion of the primary housing 102 may serve as an offsetting structure 160 between the two layers of acoustic mesh material 110, 124. The offsetting structure 160 has an overall thickness (the vertical dimension depicted in FIG. 9) that is designed to maintain spacing between the two layers of acoustic mesh material 110, 124. In certain embodiments, including the one shown in FIG. 9, the acoustic port 132 is formed within the offsetting structure 160 of the primary housing 102. In this regard, the primary housing 102 and the acoustic port 132 are configured to maintain an acoustic air gap 162 between the two layers of acoustic mesh material 110, 124. The acoustic air gap 162 may be defined as the separation distance between the two layers of acoustic mesh material 110, 124, measured along an imaginary line that is orthogonal to the two layers (see FIG. 9). In certain embodiments, the acoustic air gap 162 is defined to be within the range of about 1.0 to 2.0 millimeters. The size of the acoustic air gap 162 can be optimized to provide the desired amount of visual obscurity and to meet certain audio quality metrics, while satisfying any physical constraints associated with the overall packaging requirements of the electronic device 100, the primary housing 102, and the like.

The decorative cover 104 can be coupled to the primary housing 102, either directly or indirectly as needed. The decorative cover 104 can be secured to the primary housing 102 using any suitable material, features, or technology, such as an adhesive, a snap-fit feature, tabs, bonding, or the like. The embodiment described here utilizes an adhesive layer 166 to affix the decorative cover 104 to the primary housing 102 (see FIG. 8).

As mentioned above, the decorative cover 104 includes a port opening 108 formed therein. The port opening 108 acoustically communicates with the acoustic port 132 via the upper layer of acoustic mesh material 110. In this regard, the decorative cover 104 is positioned overlying a portion of the upper layer of acoustic mesh material 110 such that the portion of the upper layer of acoustic mesh material 110 is located between the decorative cover 104 and the exterior mounting surface 130 of the primary housing 102, while the remaining section of the upper layer of acoustic mesh material 110 is exposed through the port opening 108. In accordance with this exemplary arrangement, the decorative cover 104 serves to hold and maintain the outer edge of the upper layer of acoustic mesh material 110 in place. As shown in FIG. 9, the decorative cover 104 may be coupled to the off-setting structure 160 of the primary housing 102 in a desired location and position such that at least a portion of the port opening 108 is aligned with at least a portion of the acoustic port 132 (more specifically, the upper acoustic port 132a). In other words, the port opening 108 serves as a continuation of the acoustic port 132, with the upper layer of acoustic mesh material 110 intervening between the acoustic port 132 and the port opening 108.

The lower layer of acoustic mesh material 124, the acoustic port 132, the upper layer of acoustic mesh material 110, and the port opening 108 of the decorative cover 104 are suitably configured to provide an acoustic path from the acoustic transducer 120 to an area external to the electronic device 100. Ideally, the path for sound emitted by the acoustic transducer has little to no effective acoustic impedance associated therewith, which minimizes volume attenuation and preserves the audio fidelity of the emitted sound. Moreover, the layers of acoustic mesh material 110, 124 cooperate to freely pass sound waves while hiding the acoustic transducer 120 and/or other internal components from view.

In lieu of a single, tighter mesh weave to provide increased visual masking, the exemplary embodiment described herein employs two spaced-apart layers of low density acoustic mesh material separated by an acoustic air gap to satisfy cosmetic and audio requirements. For the described loudspeaker application, one layer of the acoustic mesh material is placed internally on or near the loudspeaker sealing surface, and the second layer is placed on the outside surface of the port area, just below the decorative cover 104. The intentional acoustic air gap between the two layers of acoustic mesh material results in little to no cumulative restrictive effect or degradation of the audio performance. The use of two meshes separated by the acoustic air gap creates a staggering effect of the mesh openings, which significantly reduces the "straight through" visibility of the acoustic system. The resulting cosmetic masking of the opening is similar to using a single, tighter weave mesh, without any audio degradation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing", or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electronic device comprising:
    a primary housing that defines at least a portion of an interior volume for the electronic device, the primary housing comprising an interior mounting surface, an exterior mounting surface, and an acoustic port formed therein;
    an acoustic transducer located within the interior volume;
    a lower layer of acoustic mesh material coupled between the interior mounting surface and the acoustic transducer and covering a lower opening of the acoustic port, the lower layer of acoustic mesh material comprising a bottom surface facing the acoustic transducer and a top surface facing the acoustic port; and
    an upper layer of acoustic mesh material coupled to the exterior mounting surface and covering an upper opening of the acoustic port, the upper layer of acoustic mesh material comprising a bottom surface facing the acoustic port;
    wherein each of the lower layer of acoustic mesh material and the upper layer of acoustic mesh material is configured to provide an amount of acoustic transparency and an amount of visual obscurity.

2. The electronic device of claim 1, wherein:
    the lower opening of the acoustic port terminates at the interior mounting surface of the primary housing; and
    the upper opening of the acoustic port terminates at the exterior mounting surface of the primary housing.

3. The electronic device of claim 1, wherein the acoustic transducer is a loudspeaker for use with a speakerphone function of the electronic device.

4. The electronic device of claim 1, wherein:
    the bottom surface of the lower layer of acoustic mesh material is coupled to the acoustic transducer; and
    the top surface of the lower layer of acoustic mesh material is coupled to an area of the interior mounting surface that surrounds the lower opening of the acoustic port.

5. The electronic device of claim 1, wherein:
    the bottom surface of the upper layer of acoustic mesh material is coupled to an area of the exterior mounting surface that surrounds the upper opening of the acoustic port.

6. The electronic device of claim 1, wherein the lower layer of acoustic mesh material and the upper layer of acoustic mesh material are fabricated from an identical mesh material.

7. The electronic device of claim 1, wherein:
    the lower layer of acoustic mesh material has a consistent pore size; and
    the upper layer of acoustic mesh material has the consistent pore size.

8. The electronic device of claim 1, wherein:
    the lower layer of acoustic mesh material has a defined acoustic resistance; and
    the upper layer of acoustic mesh material has the defined acoustic resistance.

9. The electronic device of claim 1, wherein the primary housing and the acoustic port are configured to maintain an acoustic air gap between the upper layer of acoustic mesh material and the lower layer of acoustic mesh material.

10. The electronic device of claim 1, further comprising a decorative cover coupled to the primary housing, the decorative cover having a port opening formed therein, wherein the port opening acoustically communicates with the acoustic port via the upper layer of acoustic mesh material.

11. The electronic device of claim 10, wherein the lower layer of acoustic material, the acoustic port, the upper layer of acoustic material, and the port opening are configured to provide an acoustic path from the acoustic transducer to an area external to the electronic device.

12. An acoustic system for an electronic device, the acoustic system comprising:
    an acoustic transducer;
    a first layer of an acoustic mesh material overlying the acoustic transducer, wherein the acoustic mesh material provides an amount of acoustic transparency and an amount of visual obscurity;
    a second layer of the acoustic mesh material overlying the first layer of the acoustic mesh material;
    an offsetting structure between the first layer of the acoustic mesh material and the second layer of the acoustic mesh material, the offsetting structure having a thickness to maintain spacing between the first layer of the acoustic mesh material and the second layer of the acoustic mesh material; and
    an acoustic port formed within the offsetting structure; wherein:
    the first layer of the acoustic mesh material is positioned between the acoustic transducer and a first end of the acoustic port;
    the first layer of the acoustic mesh material covers the first end of the acoustic port; and
    the second layer of the acoustic mesh material covers a second end of the acoustic port.

13. The acoustic system of claim 12, wherein the acoustic transducer is a loudspeaker for use with a speakerphone function of the electronic device.

14. The acoustic system of claim 12, wherein the acoustic port has a stepped cross-sectional profile.

15. The acoustic system of claim 12, wherein the first layer of the acoustic mesh material cooperates with the second layer of the acoustic mesh material to hide the acoustic transducer from a view external to the electronic device.

16. The acoustic system of claim 12, further comprising a decorative cover coupled to the offsetting structure, the decorative cover having a port opening formed therein, wherein at least a portion of the port opening is aligned with at least a portion of the acoustic port.

17. A mobile electronic device comprising:
    a primary housing that defines at least a portion of an interior volume for the mobile electronic device, the primary housing comprising an interior mounting surface, an exterior mounting surface, and an acoustic port formed therein, wherein the acoustic port extends between the interior mounting surface and the exterior mounting surface such that an upper opening of the acoustic port terminates at the exterior mounting surface and such that a lower opening of the acoustic port terminates at the interior mounting surface;
    an upper layer of acoustic mesh material coupled to the exterior mounting surface, the upper layer of acoustic mesh material extending across and covering the upper opening of the acoustic port;
    a decorative cover coupled to the primary housing, the decorative cover overlying a portion of the upper layer of acoustic mesh material such that the portion of the upper layer of acoustic mesh material is located between the decorative cover and the primary housing, and the decorative cover having a port opening formed therein;
    a lower layer of acoustic mesh material having a top surface coupled to the interior mounting surface of the primary housing, the lower layer of acoustic mesh material extending across and covering the lower opening of the acoustic port; and a loudspeaker located within the interior volume of the primary housing, the loudspeaker coupled to a bottom surface of the lower layer of acoustic mesh material; wherein:

the lower layer of acoustic mesh material, the acoustic port, the upper layer of acoustic mesh material, and the port opening cooperate to provide an acoustic path for sound emitted from the loudspeaker;

the lower layer of acoustic mesh material and the upper layer of acoustic mesh material provide an amount of acoustic transparency; and the lower layer of acoustic mesh material cooperates with the upper layer of acoustic mesh material to hide the loudspeaker from a view external to the mobile electronic device.

18. The mobile electronic device of claim 17, wherein the lower layer of acoustic mesh material and the upper layer of acoustic mesh material are fabricated from an identical mesh material.

19. The mobile electronic device of claim 17, wherein:
the lower layer of acoustic mesh material has a consistent pore size; and
the upper layer of acoustic mesh material has the consistent pore size.

20. The mobile electronic device of claim 17, wherein:
the lower layer of acoustic mesh material has a defined acoustic resistance; and
the upper layer of acoustic mesh material has the defined acoustic resistance.

* * * * *